United States Patent

[11] 3,628,170

[72] Inventor Martin Carl Steele
Princeton, N.J.
[21] Appl. No. 824,222
[22] Filed May 13, 1969
[45] Patented Dec. 14, 1971
[73] Assignee RCA Corporation

[54] LSA OR HYBRID MODE OSCILLATOR STARTED BY SERIES-CONNECTED GUNN OR QUENCHED MODE OSCILLATOR
6 Claims, 1 Drawing Fig.

[52] U.S. Cl. .......... 331/52, 317/234 V, 331/54, 331/96, 331/107 G
[51] Int. Cl. .......... H03b 7/14
[50] Field of Search .......... 331/107 G, 50, 52, 54, 96; 317/234 (10)

[56] References Cited

UNITED STATES PATENTS 3,414,841 12/1968 Copeland .......... 331/107 G
3,436,680 4/1969 Hasty .......... 331/107 G
3,479,611 11/1969 Sandbank et al. .......... 331/107 G X
3,516,018 6/1970 Yu et al. .......... 331/107 G

*Primary Examiner*—Roy Lake
*Assistant Examiner*—Siegfried H. Grimm
*Attorney*—Edward J. Norton

ABSTRACT: Microwave oscillations at the tuned frequency of a given resonant cavity generated by a bulk semiconductor negative differential resistance device operating only in a non-domain initiated mode, such as the hybrid mode or LSA mode, is started by another bulk semiconductor negative differential resistance device operating at the given frequency in a domain initiated mode, such as the transit time mode or the quenched mode. This is accomplished by locating both devices within the given resonant cavity, properly choosing their threshold currents with respect to each other, and applying a certain value of bias current serially through both devices.

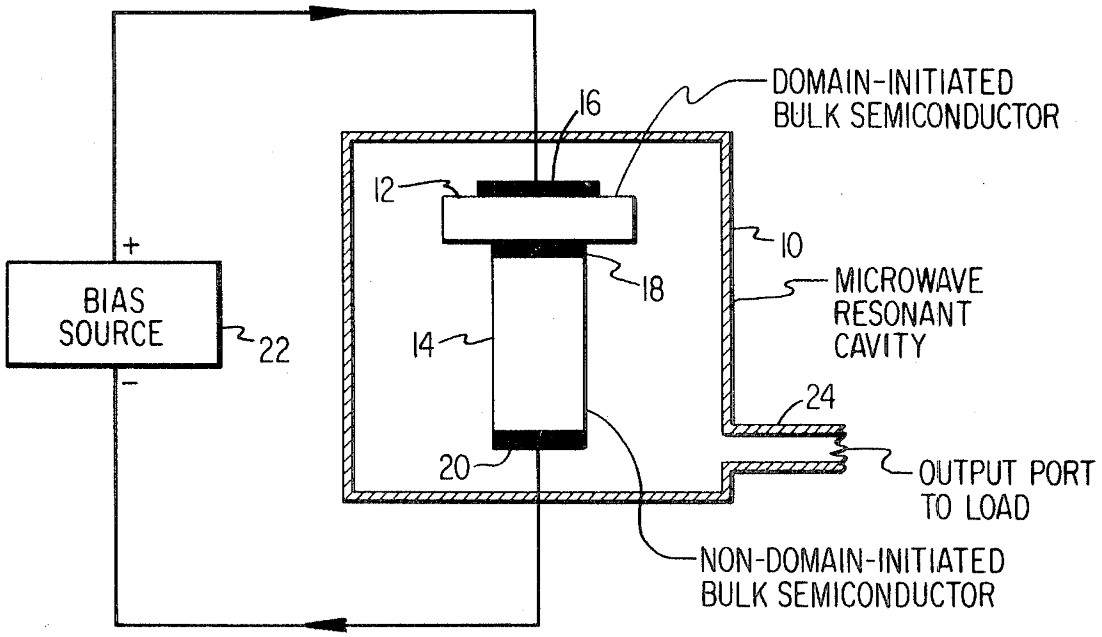
INVENTOR
Martin Carl Steele
BY George J Seligsohn
ATTORNEY

LSA OR HYBRID MODE OSCILLATOR STARTED BY SERIES-CONNECTED GUNN OR QUENCHED MODE OSCILLATOR

This invention relates to solid-state microwave oscillators and, more particularly, to such oscillators employing a bulk semiconductor negative differential resistance device operating in a nondomain initiated mode.

It is known that bulk semiconductor negative differential resistance devices, sometimes known as Gunn devices, such as properly doped gallium arsenide, may be employed to generate microwave oscillations. These devices are capable of operating in a plurality of different modes including the transit time or Gunn effect mode, the quenched mode, the hybrid mode and the limited space charge accumulation (LSA) mode.

In the transit time mode, when a proper bias current is applied through the device, a domain is initiated at one terminal of the device and travels at a certain drift velocity to the other terminal of the device, where it extinguishes, and the whole process is then repeated. In the transit time mode, the frequency of oscillation is directly proportional to the drift velocity and inversely proportional to the length of the semiconductor between terminals. Further, in the transit time mode no resonant cavity is required, although a resonant cavity tuned to the transit time frequency or a harmonic or subharmonic thereof may be employed.

The other three modes of operating a bulk semiconductor negative differential resistance device, mentioned above, require the use of a resonant cavity tuned to a frequency which is higher than the transit time frequency of the device. However, in the case of the quenched mode, the frequency of the cavity is not high enough to prevent a mature domain to form at one terminal of the device and start drifting toward the other terminal of the device. However, before it reaches the other terminal of the device the electric field of the cavity oscillations becomes strong enough to move the operating point of the device into the positive differential resistance region thereof for an appropriate half-cycle of each oscillation, thereby quenching the domain. As soon as a domain is extinguished, a new domain begins at the aforesaid one terminal. From the foregoing it will be seen that in both the transit time mode and the quenched mode, a complete domain is formed and travels at least a portion of the distance between the two terminals before it is extinguished, i.e., each of these two modes is domain initiated. Since this is the case, initiation of oscillation is inherent and no problem of initiating oscillations exists.

In the other two above-mentioned modes of operation of the device, namely, the hybrid mode and the LSA mode, the initiation of oscillation is a problem because complete domains are never formed. In particular, in the case of the hybrid mode the cavity is tuned to a frequency having a period nearly equal to the time required for a domain to form. Once such an oscillator is oscillating at the cavity frequency, the oscillations in the cavity quench the formation of a domain during each cycle of the oscillations. When quenched, the domain attempts to build up again, but before it is complete it is again quenched. In the LSA mode, the resonant cavity is tuned to a frequency which has a period which is quite short even when compared to the time required for a domain to be formed. Therefore, when the oscillator is oscillating, the device is quenched during each cycle of the oscillations at a time when the domain then building up is still very immature. Thus, the hybrid and LSA modes are nondomain initiated.

The hybrid mode and even more so the LSA mode hold the promise of generating extremely high frequencies (20 gigaHertz and above) with high efficiencies at relatively high powers. One of the problems in operating an oscillator in either of these modes, however, is that they are difficult to initially start. Heretofore, it has been the practice to carefully match the resonant circuit to the semiconductor device, which has often required using circuits that are doubly resonant at both a low and high frequency, to obtain the required quenching signal before the oscillator actually starts to oscillate by using the device to amplify noise signals which are inherently present. Not only is this approach difficult when it can be made to work, but it does not work consistently.

The present invention is directed to apparatus for starting a microwave oscillator employing a bulk semiconductor negative differential resistance device operating in a nondomain initiated mode, such as the hybrid mode or the LSA mode, which starting apparatus is exclusive of the device itself. In particular, the apparatus provides a signal of the cavity frequency at a sufficient amplitude to initiate oscillations. Once the oscillator is started, the oscillator itself provides such a signal to maintain oscillations.

Although this starting signal may be introduced into the cavity from an external source, it is preferably obtained from a second oscillator operating at its transit time mode within the cavity. The second oscillator may either be in series or parallel with the device to be started, with the series arrangement being more desirable because of its higher impedance characteristics.

It is therefore an object of the present invention to provide a starter for a microwave oscillator employing a bulk semiconductor negative differential resistance device operating in a nondomain initiated mode.

This and other objects, features and advantages of the present invention will become more apparent from the following detailed description in which:

The sole FIGURE is a block diagram of a preferred embodiment of the present invention.

Referring to the drawing, microwave resonant cavity 10 has situated therein domain initiated bulk semiconductor 12 and nondomain initiated bulk semiconductor 14. The upper end of semiconductor 12 is provided with ohmic contact 16, the interface between semiconductor 12 and semiconductor 14 is provided with ohmic contact 18 and the lower end of semiconductor 14 is provided with ohmic contact 20. Bias source 22, which may be either a continuous DC source or a DC pulse source, has its positive terminal connected to contact 16 and its negative terminal connected to contact 20. In this manner, semiconductors 12 and 14 are connected in a series circuit with bias source 22. Microwave resonant cavity 10 includes an output port 24 for connection to a load.

In operation, it will be seen that bias source 22 will provide the same conduction current through serially connected semiconductor 12 and semiconductor 14. (Even if bias source 22 is a pulsed DC source, rather than a continuous DC source, the duration of a pulse from source 22 is so long compared to the period corresponding to the microwave frequency to which cavity 10 is tuned that the pulse nature of the biasing signal can be ignored and only its DC characteristic need be considered.)

The doping and cross-sectional area of domain initiated bulk semiconductor 12 is made such that the value of threshold current at which semiconductor 12 begins to exhibit negative differential resistance differs from that of semiconductor 14 by no more than a given amount which depends upon the displacement current due to the presence of RF electric fields at the cavity frequency. In practice, this permits the threshold current of the two semiconductors to differ by up to 5 to 10 percent with the same value of conduction current traveling through series-connected semiconductors 12 and 14. If it were not for the contribution of displacement current, the threshold values of the two semiconductors would have to be substantially identical to each other; otherwise, with the same conduction current through both semiconductors, only the semiconductor with the lower threshold current would be capable of oscillating and the other semiconductor would merely absorb power.

Domain initiated bulk semiconductor 12 is dimensioned to have its transit time mode at a frequency which is either substantially identical to or somewhat lower than the frequency to which cavity 10 is tuned. In the former case, with bias source 22 providing a bias current sufficient to operate semiconductor 12 in its negative differential resistance region, semiconductor 12 will operate in its transit time mode to generate an oscillation signal within cavity 10 at the frequency to which cavity 10 is tuned. In the latter case, with bias source 22 providing a bias current sufficient to operate semiconductor 12 in its negative differential resistance region, semiconductor 12 will operate in its quenched mode to generate an oscillation signal within cavity 10 at a frequency to which cavity 10 is tuned. In either case, the Q of the oscillator formed by semiconductor 12 and cavity 10 is such that the amplitude of the electric field of the oscillation signal produced thereby is sufficient to drive the instantaneous current through semiconductor 14 from its operating point in the negative differential resistance region of its characteristic curve into the positive differential resistance region thereof below threshold current, which is required to start nondomain initiated semiconductor 14 oscillating in either its hybrid or LSA mode (depending on the dimensions and doping and semiconductor 14) at the frequency to which cavity 10 is tuned. Once oscillating, semiconductor 14 will generate oscillations having the proper frequency and sufficient amplitude to maintain it oscillating even without any contribution from oscillations generated by semiconductor 12.

What is claimed is:

1. A microwave oscillator comprising a resonant cavity tuned to a given frequency, a first bulk semiconductor negative differential resistance device located within said cavity which first device is capable of oscillating at said given frequency in a domain initiated mode, a second bulk semiconductor negative differential resistance device located within said cavity which second device is capable of oscillating at said given frequency only in a nondomain initiated mode, and means for serially applying a certain value of biasing current through both said first and second devices, wherein said first device has a first value of threshold current and said second device has a second value of threshold current which differs from the first value by no more than an amount which in response to the application of said biasing current results in said first device generating a starting signal of said given frequency in said cavity with an amplitude sufficient to initiate said second device to generate self-sustaining oscillations at said given frequency in said cavity.

2. The oscillator defined in claim 1, wherein said second device operates in the limited space charge accumulation mode at said given frequency.

3. The oscillator defined in claim 1, wherein said second device operates in the hybrid mode at said given frequency.

4. The oscillator defined in claim 1, wherein said first device operates in the transit time mode at said given frequency.

5. The oscillator defined in claim 1, wherein said first device operates in the quenched mode at said given frequency.

6. The oscillator defined in claim 1, wherein said first and second values of threshold current are substantially identical to each other.

* * * * *